METHOD OF IMPROVING PROPERTIES OF AN ALLOY BY RADIATION

Filed Aug. 14, 1962

INVENTOR.
ARTHUR C. DAMASK

BY S. J. Rotondi, A. J. Dupont & S. Dubroff

ATTORNEYS:

3,193,678

METHOD OF IMPROVING PROPERTIES OF AN ALLOY BY RADIATION

Arthur C. Damask, Margate, N.J., assignor to the United States of America as represented by the Secretary of the Army Filed Aug. 14, 1962, Ser. No. 217,782
6 Claims. (Cl. 250—49.5)
(Granted under Title 35, U.S. Code (1952), sec. 266)

Figure 1:
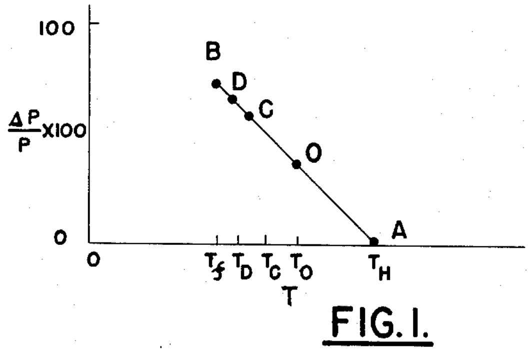

The invention described herein may be manufactured and used by or for the Government for governmental purposes without the payment to me of any royalty thereon.

This invention relates to a method for altering the physical and mechanical properties of certain solids and more particularly to a method for promoting order-disorder and other diffusion reactions by formation of excess vacancies through gamma-ray irradiation and temperature control.

Certain order-disorder and diffusion reactions are of commercially economic importance as, for example: the formation of p and n barriers in a semi-conductor material to form a junction type transistor by controlled diffusion of impurities; the diffusion control of structure and distribution of impurities as used in the manufacture of the silicon solar battery, the silicon power rectifier, the silicon switching diode, and the germanium amplifier; diffusion ordering of the iron nickel compound "Permaloy" ($FeNi_3$) to improve magnetostriction; diffusion ordering of $MnNi_3$ (which is paramagnetic when disordered) to improve its ferromagnetic properties; the cladding of metals and alloys where the core and cladding are bonded by the combination of pressure and conditions which will promote diffusion across the interface; sintering of metal powder and ceramic powder compacts to cause diffusion bonding of the individual particles; increasing the hardness and strength, or decreasing the electrical resistivity of precipitation or ordering type alloys by diffusion; forming new precipitation type alloys by diffusion of dissimilar metals in a powder compact; increasing the order in ferrites such as $MgFe_2O_4$ to decrease the resistivity.

Thermal treatment methods generally have been used in the past to promote order-disorder and other diffusion reactions of the types described. A major disadvantage of such thermal treatment methods arises from the time-temperature dependence of the diffusional processes which occur through a vacancy mechanism wherein an atom cannot move from its lattice site unless it moves to an adjacent vacancy and the number of vacancies, and hence the diffusion rate, is an exponential function of the absolute temperature. A further disadvantage of such thermal treatment methods for increasing the rate of diffusional processes which are dependent on the vacancy mechanism is that there exists a temperature, which we may designate $T_c$ below which, for all practical purposes, there exist insufficient vacancies for diffusional processes to take place at any appreciable rate. $T_c$, or the "freezing in" temperature for atoms represents a practical lower temperature limit below which thermal means alone will be ineffective in promoting diffusional processes. $T_f$, or the "freezing in" temperature for vacancies represents a practical lower temperature limit below which no treatment will be effective in promoting diffusional processes of the type described. In consequence of these controlling effects of temperature, economic consideration dictates the use of elevated temperature processing since use of a temperature only slightly above $T_c$ will result in a greatly extended treatment period for effecting the desired physical or mechanical change by diffusion which is dependent on the vacancy mechanism. The maximum permissible operating temperature, of course, is limited by other considerations such as the temperature at which melting, decomposition, or dissociation occurs, or the vapor pressure of the substance undergoing thermal treatment may limit the useful maximum temperature. Controlled atmosphere environment is often required to suppress or prevent undesirable side reactions such as oxidation, during thermal treatment. Whenever the thermal stability of the material being processed precludes the use of elevated temperature the processing time required to effect the desired change in physical or mechanical properties by thermal treatment is greatly extended. This effect is particularly apparent in the manufacture of thin wafer transistors, wherein the controlled diffusion of the n and p impurity elements must be carried out at relatively low temperature.

It is known that diffusional processes can be accelerated through introduction of excess vacancies by irradiation exposure to the multi-component radiation generated in a neutronic reactor. However, the commercial utility of such multi-component irradiaton is limited to solids of the class in which induced radioactivity will not be a serious problem. Also, because the radiation is not monoenergetic, it is difficult to introduce a precise number of excess vacancies into the solid. In addition, requirements for shielding and cooling the neutronic reactor complicate the mechanics of irradiation exposure and subsequent removal of the solid after irradiation and serve to limit the size and configuration of the object being irradiated. Because the irradiation induced enhancement of diffusional processes which occur through a vacancy mechanism is economically desirable, various efforts have been made to irradiate solids in a manner which will leave the solid substantially free of induced radioactivity.

In U.S. Patent No. 2,911,533, November 3, 1959, a method is disclosed for enhancing diffusional processes which depend on the vacancy mechanism by electron irradiation to promote controlled vacancy formation at temperatures either below or above the "freezing in" temperature $T_c$. Electron irradiation is a simple and effective method of enhancing the desired diffusional processes but is limited in its utility to solids having a dimension normal to the plane of exposure to the electrons which is of the order of only a few millimeters and which is dependent upon the initial energy of the electrons as well as the density and the average atomic number of the chemical elements in the material being treated. Therefore, electron irradiation is essentially a surface treatment and is not effective for materials of large dimensional cross section.

A method of irradiating solids with gamma rays which can penetrate solids to a distance on the order of 100 times the distance for electron irradiation was disclosed by R. A. Dugdale in London Phys. Society, 246, 1955. Dugdale demonstrated that ordering could be achieved, as measured by resistivity changes, by irradiating a suitable solid with gamma rays from a $Co^{60}$ source at a temperature below the "freezing in" temperature $T_f$ and allowing the vacancies caused by the irradiation to migrate during subsequent heating to a temperature above $T_f$. It is the particular object of this invention to provide a new and novel method for promoting order-disorder and diffusional reactions of the type described by gamma-irradiation at a constant temperature without subsequent thermal treatment. It is a further object of this invention to provide a method for increasing, by an order of magnitude, the rate of such gamma irradiation induced physical and mechanical changes. A still further object of this invention is to provide a method for introducing a controlled amount of vacancies into a solid at a temperature above $T_f$, the vacancy "freezing in" temperature.

This invention is predicated upon the discovery that in the class of solids in which diffusion occurs through a vacancy mechanism the presence of additional vacancies in excess of the equilibrium number normally present at any one temperature increases the rate of diffusion and allows diffusional changes to occur which normally would not take place in any reasonable length of time at the same temperature. Thus, by utilizing my discovery, I am able to enhance diffusion and so improve many physical and mechanical properties of certain solids, because the physical and mechanical properties are related to the atomic rearrangement brought about by diffusion which occurs through a vacancy mechanism, and I have discovered a precise way to increase the number of vacancies through gamma ray irradiation at temperatures above the "freezing in" temperature for vacancies.

According to the process of this invention therefore, in a process for enhancing diffusion in solids in which diffusion occurs by a vacancy mechanism and in which additional vacancies in excess of those present as a consequence of thermal equilibrium are introduced by irradiation, I provide the improvement comprising the steps of placing the solid in a suitable heat-sink maintained at a constant temperature above $T_f$ of the solid by conventional means and irradiating the solid with gamma rays from a suitable source while maintaining substantially constant temperature in the heat sink and continuing the irradiation until the solid has been exposed to a total gamma ray flux predetermined to cause a precise increase in the number of vacancies and which will be evidenced by certain physical or mechanical changes which are readily susceptible to measurement by conventional methods. The energy of the gamma or other electromagnetic ray must be at least 0.1 mev. or greater, depending upon the physical properties such as the mass of the atoms of the substance being irradiated.

Figure 2:
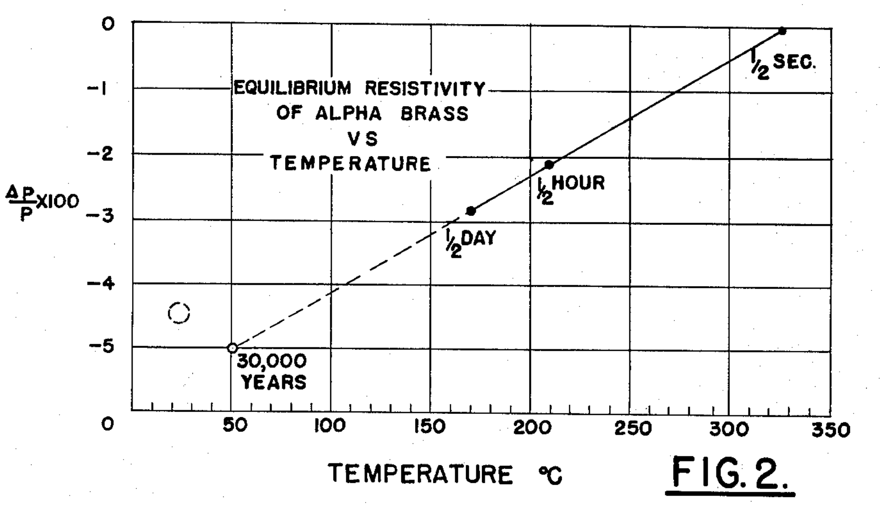
Figure 3:
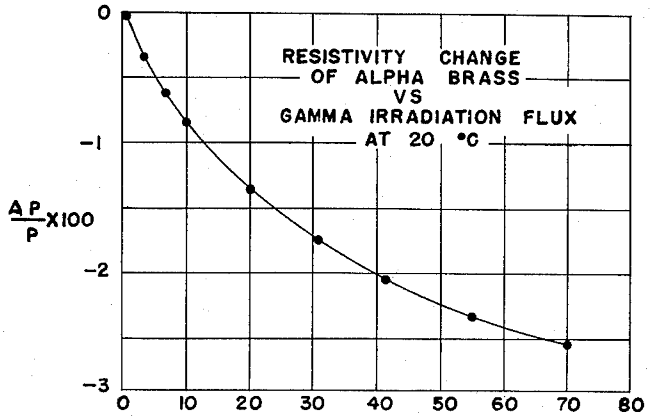

For a full and more complete understanding of the invention, reference may be made to the following description and accompanying drawing wherein FIG. 1 is a generalized graph of any property change brought about by diffusion through a vacancy mechanism charted as a function of temperature, FIG. 2 is a graph of the equilibrium electrical resistance changes in alpha brass as a function of equilibrium temperature, and FIG. 3 is a graph of the change in electrical resistivity of alpha brass as a function of gamma radiation flux.

In solids of the kind in which diffusion occurs through a vacancy mechanism to effect a change in order, which change in order is manifested as a physical or mechanical change in the properties of the solid, the change in the measured property as a function of the temperature when graphed has the general appearance illustrated in FIG. 1 where the percentage change in the property is shown decreasing linearly with increasing temperature. It should be understood that the change in a measured property may increase with temperature or the change in property may vary less regularly than is illustrated. In FIG. 1, line $\overline{AB}$ represents the range of change in property, $$\frac{\Delta P}{P}\times 100$$

which normally occurs at any temperature T. The upper terminus C of line $\overline{AB}$ represents the point where, for all practical purposes, diffusion by thermal means alone is no longer operative. Point B corresponds to the "freezing in" temperature for vacancies, $T_f$. Whereas line $\overline{AB}$ represents the equilibrium value of the property change, $$\frac{\Delta P}{P}\times 100$$

the approach to the equilibrium value may require in excess of thousands of years at temperatures in the neighborhood of $T_f$ and require only fractions of a second at a temperature $T_h$, corresponding to the equilibrium temperature for point A. In economical industrial operations utilizing thermally initiated diffusion, temperature $T_o$, $T_c$ or above and below $T_h$, is generally used for thermal treatment to effect a reasonable change in properties in a reasonable time interval as shown by point 0 on $\overline{AB}$. By the process of my invention I provide a method for obtaining, in a reasonable time interval, a property change D on line $\overline{AB}$ at low temperature in the temperature range $T_f$ to $T_c$. The property change D is in excess of that economically obtainable by purely thermal means and also is an appreciably large fraction of the theoretical maximum property obtainable by purely thermal means which is identified by point B on line $\overline{AB}$. I accomplish this change by irradiation of the solid with gamma irradiation while maintaining the temperature of the solid at a constant value $T_D$, at some convenient temperature above $T_f$, the "freezing in" temperature.

Referring now to FIG. 2, illustrative of a specific physical property change brought about by thermal initiated diffusion, the change in equilibrium electrical resistivity of alpha brass (a copper-zinc alloy which exhibits electrical resistivity lowering in response to increase in short range order) is plotted as a function of the equilibrium temperature and the solid circles are identified with the experimentally determined periods of time required to reach equilibrium at each indicated temperature by thermal means alone, the electrical resistivity being measured at liquid nitrogen temperature (Journal of Applied Physics, v. 27, 610, 1956). The open circle represents the calculated equilibrium condition for 50° C. Electrical resistivity change in FIG. 2 is based on the 320° C. value of resistivity. The "freezing in" temperature for vacancies in alpha brass is about −30° C. The broken line open circle represents the electrical resistivity achieved in alpha brass wires by my gamma irradiation thereof at 20° C. The value of electrical resistivity is the same as that which would be obtained through thermal means alone by holding the sample at 20° C. for at least 30,000 years.

As an example of my process, I have experimentally determined that the electrical resistivity of alpha brass is lowered by irradiation of samples thereof with gamma rays from a $Co^{60}$ source while the alpha brass is maintained at a temperature above the "freezing in" temperature of the vacancies.

In my experiments I used alpha brass wires (70% copper and 30% zinc) drawn to 0.013 inch diameter and annealed at 400° C. to remove the effects of cold work. Electrical lead wires for resistivity measurements were soldered on the alpha brass wires which were then heated at 210° C. for 45 minutes to establish a thermal equilibrium order at that temperature. Referring to FIG. 2 again, it can be seen that the thermal equilibrium electrical resistivity is reached in about one-half hour. The alpha brass wires which were about two inches long were sealed in a quartz tube and placed in a water bath, the temperature of which was approximately 20° C. Gamma irradiation of the wires was carried out normal to the long axis of the wires. Periodically, during the period of exposure to the gamma ray flux the alpha brass wires were removed from the irradiation and the resistivities of the wires were measured at liquid nitrogen temperature in a conventional way.

The graph of my measurements of the percent change of the electrical resistivity, $$\frac{\Delta P}{P}\times 100$$

of alpha brass as a function of gamma ray irradiation flux is shown in FIG. 3. The change in electrical resistivity is based on the 210° C. value of resistivity. This graph shows that irradiation of alpha brass with gamma rays causes the electrical resistivity of alpha brass to decrease with increasing irradiation at an initial rapid rate which gradually falls off as the electrical resistance asymptotically approaches a limiting value. The electrical resistance for a gamma ray irradiation of $65 \times 10^8$R corresponds to the broken line circle in FIG. 2. This resistivity change corresponds to a ten-fold increase in diffusion rate over the rate obtainable by gamma irradiation below $T_f$, the "freezing in" temperature of vacancies followed by subsequent warming to a temperature above $T_f$. This indicates that my process of irradiating at a temperature above $T_f$, at which a vacancy is free to diffuse as soon as it is formed, is much more efficient than forming all the vacancies below $T_f$, at which temperature they are "frozen in" and cannot move, and then warming the sample and allowing them all to diffuse at the same time.

My invention involves a combination of gamma irradiation of certain solids with other steps to produce novel and useful products. Products are produced both faster at higher temperatures and in a reasonable length of time at lower temperatures as compared with heat treatment alone. The former is particularly important where time is of the essence. The latter lessens difficulties concomitant with heat treatment at higher temperatures, e.g., corrosion problems and requirements of special atmospheres.

Among the practical processes in accordance with my invention, the following are particularly valuable:

(1) The decrease or increase of resistivity and associated properties of ordering or precipitating alloys.

(2) The increase of atomic interchange across an intermetallic interface between two metals, established by forming a metallic layer on a metal body by a conventional technique such as electroplating or vapor-deposition, by irradiating the layer with gamma rays of sufficiently high energy to penetrate the layer and pass into the metal body with an energy above 0.1 mev.

(3) The increase in the rate of sintering of finely divided solid material by irradiating the material at a temperature where the vacancies formed thereby are immobile and then raising the temperature until the vacancies are mobile.

(4) The increase in the rate of sintering of finely divided solid material by irradiating the material at a temperature at which the vacancies thus produced are mobile and therefore accelerate the normal thermal diffusion at the irradiation temperature.

(5) Enhancement of the bonding of two pieces of solid by irradiating the surfaces to be bonded with gamma rays at a temperature where the vacancies formed thereby are immobile and subjecting the pieces to pressures transverse to the surfaces at a temperature where the vacancies are mobile.

I am able to carry out these processes involving sintering or bonding or diffusion at a lower temperature or at a greater rate than has heretofore been possible. In some instances, results can be obtained which heat alone could not achieve.

Alloys useful in the processes itemized above, as determined by the above-referred-to experimental method, as copper-zinc, copper-nickel, silver-gold, silver-palladium, nickel-cobalt, nickel-gold, nickel-iron. The composition of each element listed can be from 0 to 100% of the alloy system indicated.

By the practice of my invention I also: increase the magnetization of ferromagnetic alloys such as $MnNi_3$; increase the magnetostriction of certain alloys such as $FeNi_3$; decrease the resistivity of ferrites such as $MgFe_2O_4$ and so obtain a diminution of power losses therein due to eddy currents; and increase the hardness of precipitating alloys by increasing the amount or rate of precipitation.

Further, by my invention, I permit n- and p-type impurity elements such as tin and antimony respectively, to be diffused into a semi-conductor such as germanium at much lower temperatures than was previously obtainable within human lifetimes.

It is recognized by scientists that so called gamma rays are high energy electromagnetic rays which come from the nucleus of certain radio-active atoms. Gamma ray energies cover a wide range and it is possible to create electromagnetic rays called X-rays which have comparable energies to the lower energy gamma rays. These two entities are scientifically equivalent and it should be noted that this invention is independent of the source of these energetic electromagnetic rays.

While my invention has been disclosed with respect to several preferred applications and embodiments, it will be apparent to those skilled in the art that numerous variations and modifications may be made within the spirit and scope of the invention and thus it is not intended to limit the invention except as defined by the following claims.

I claim:

1. A method for increasing the value of the order of an alloy which exhibits an ordered arrangement of atoms, said alloy being one in which atomic diffusion occurs by a vacancy mechanism, and for which there is a theoretically producible equilibrium degree of order at any particular temperature, and for which there is an atomic freezing-in temperature below which heat alone imparted to said alloy will not produce said equilibrium degree of order, and for which there is a vacancy freezing-in temperature below which no treatment given said alloy will produce said equilibrium degree of order, the method comprising the steps including; holding the temperature of a piece of said alloy above said vacancy freezing-in temperature while irradiating said zone with electromagnetic rays having an energy of at least 0.1 mev. until the degree of order of said alloy approaches a predetermined percentage of the equilibrium degree of order at said holding temperature.

2. The method of claim 1 further characterized by said electromagnetic rays being gamma rays.

3. A method for changing the value of the resistivity of an alloy which exhibits an ordered arrangement of atoms, said alloy being one in which atomic diffusion occurs by a vacancy mechanism, and in which the resistivity varies with the degree of order, and for which there is a theoretically producible equilibrium resistivity at any particular temperature, and for which there is an atomic freezing-in temperature below which heat alone imparted to said alloy will not produce said equilibrium resistivity, and a vacancy freezing-in temperature below which no treatment given said alloy will produce said equilibrium resistivity the method comprising the steps of holding the temperature of a zone of a piece of said alloy below said atomic freezing-in temperature and above said vacancy freezing-in temperature while irradiating said zone with electromagnetic rays having an energy of at least 0.1 mev. until the resistivity of said zone approaches a predetermined percentage of the equilibrium resistivity of said holding temperature.

4. A method for increasing the value of the magnetostriction of an alloy which exhibits an ordered arrangement of atoms, said alloy being one in which atomic diffusion occurs by a vacancy mechanism, and in which there is a greater magnetostriction when there is a higher degree of order, and for which there is a theoretically producible equilibrium magnetostriction at any particular temperature, and for which there is an atomic freezing-in temperature below which heat alone will not produce said equilibrium magnetostriction and for which there is a vacancy freezing-in temperature below which no method will produce said equilibrium magnetostriction, the method comprising the steps of holding the temperature of a zone of said alloy above said vacancy freezing-in temperature and below said atomic freezing-in temperature while irradiating said zone with electromagnetic rays having an energy of at least 0.1 mev. until the magnetostriction of said zone approaches a predetermined percentage of the equilibrium magnetostriction at said holding temperature.

5. A method for increasing the value of the precipitation of a precipitating alloy, said alloy being one in which atomic diffusion occurs by a vacancy mechanism and for which there is a theoretically producible equilibrium degree of precipitation at any particular temperature, and for which there is a vacancy freezing-in temperature below which no treatment given said alloy will produce said equilibrium degree of precipitation and for which there is an atomic freezing-in temperature below which heat alone will not produce said equilibrium degree of precipitation, the method comprising the steps of holding the temperature of a zone of a piece of said alloy between said freezing-in temperatures while irradiating said zone with electromagnetic rays having an energy of at least 0.1 mev. until the degree of precipitation of said zone approaches a predetermined percentage of the equilibrium degree of precipitation at said holding temperature.

6. A method for increasing the rate of diffusion of atoms across an interface between a metal layer and a metal body, said metal body being one in which atomic diffusion occurs by a vacancy mechanism, and for which there is an atomic freezing-in temperature and a vacancy freezing-in temperature, the method comprising the steps of forming a metal layer on a metal body to establish an interface, holding the temperature of said interface above said vacancy freezing-in temperature and below said atomic freezing-in temperature while irradiating said metal layer with electromagnetic rays of a sufficiently high energy to penetrate said layer and pass into said metal body with an energy above 0.1 mev. until the desired depth of diffusion is obtained.

References Cited by the Examiner

UNITED STATES PATENTS

| | | | |
|---|---|---|---|
| 2,911,533 | 11/59 | Damask | 250—49.5 |
| 2,976,433 | 3/61 | Rappaport et al. | 148—1.5 X |

RALPH G. NILSON, *Primary Examiner.*